United States Patent
Shinohara et al.

(10) Patent No.: US 9,318,132 B2
(45) Date of Patent: Apr. 19, 2016

(54) MAGNETIC HEAD, MAGNETIC HEAD ASSEMBLY, AND MAGNETIC RECORDING AND REPRODUCING APPARATUS

(71) Applicant: TDK CORPORATION, Tokyo (JP)

(72) Inventors: Tetsuhito Shinohara, Tokyo (JP); Tsutomu Aoyama, Tokyo (JP); Yoshikazu Soeno, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/658,904

(22) Filed: Mar. 16, 2015

(65) Prior Publication Data

US 2015/0287430 A1    Oct. 8, 2015

(30) Foreign Application Priority Data

Apr. 2, 2014    (JP) .................. 2014-075944

(51) Int. Cl.
*G11B 5/127* (2006.01)
*G11B 5/31* (2006.01)
*G11B 5/00* (2006.01)

(52) U.S. Cl.
CPC ........ *G11B 5/314* (2013.01); *G11B 2005/0024* (2013.01)

(58) Field of Classification Search
CPC ............ G11B 2005/0024; G11B 5/1278; G11B 5/314; G11B 5/3116; G11B 5/127; G11B 5/315
USPC ............................. 360/125.3, 128
See application file for complete search history.

(56) References Cited

U.S. PATENT DOCUMENTS

| | | | |
|---|---|---|---|
| 6,671,127 B2 * | 12/2003 | Hsu et al. ................. | 360/125.75 |
| 7,070,716 B2 * | 7/2006 | Lam ......................... | 360/125.04 |
| 7,271,981 B2 * | 9/2007 | Ju et al. ..................... | 360/125.31 |
| 7,724,469 B2 * | 5/2010 | Gao et al. .................. | 360/125.3 |
| 7,957,098 B2 | 6/2011 | Yamada et al. | |
| 7,983,002 B2 * | 7/2011 | Pust et al. ................. | 360/125.04 |
| 8,027,110 B1 * | 9/2011 | Yamanaka et al. ............ | 360/31 |
| 8,094,399 B2 * | 1/2012 | Roppongi et al. .............. | 360/55 |
| 8,107,352 B1 * | 1/2012 | Yamanaka et al. ....... | 369/112.27 |
| 8,159,781 B2 * | 4/2012 | Taguchi et al. ............ | 360/125.3 |
| 8,264,916 B1 * | 9/2012 | Aoyama et al. ............ | 369/13.13 |
| 8,270,112 B2 * | 9/2012 | Funayama et al. ........ | 360/125.31 |
| 8,411,390 B2 * | 4/2013 | Franca-Neto et al. ... | 360/123.06 |
| 8,422,159 B2 | 4/2013 | Gao et al. | |
| 8,547,655 B2 * | 10/2013 | Aoyama et al. ................. | 360/27 |
| 8,767,346 B2 * | 7/2014 | Yamada et al. .......... | 360/123.11 |
| 2009/0021861 A1 * | 1/2009 | Vas'ko et al. ................. | 360/122 |
| 2009/0052095 A1 | 2/2009 | Yamada et al. | |
| 2009/0262457 A1 * | 10/2009 | Rivkin et al. ................. | 360/110 |

(Continued)

FOREIGN PATENT DOCUMENTS

JP        2009070541 A    4/2009

*Primary Examiner* — Will J Klimowicz
(74) *Attorney, Agent, or Firm* — Oliff PLC

(57) ABSTRACT

A magnetic head includes a main magnetic pole used to apply a recording signal magnetic field to a magnetic recording medium and also includes a microwave line through which a microwave alternating current is transferred. The microwave line is connected to the main magnetic pole. The entire end surface of the main magnetic pole is positioned closer to air bearing surface than a connection portion at which the microwave line and main magnetic pole are mutually connected. Therefore, microwave assisted magnetic recording is possible without deteriorating the recording signal magnetic field.

8 Claims, 16 Drawing Sheets

(56) References Cited

U.S. PATENT DOCUMENTS

| | | | |
|---|---|---|---|
| 2010/0027158 A1* | 2/2010 | Takagishi et al. | 360/77.02 |
| 2010/0073809 A1* | 3/2010 | Richter et al. | 360/77.02 |
| 2010/0309577 A1 | 12/2010 | Gao et al. | |
| 2011/0273800 A1* | 11/2011 | Takano et al. | 360/125.12 |
| 2012/0162823 A1* | 6/2012 | Ikai et al. | 360/234.3 |

* cited by examiner

MAGNETIC HEAD, MAGNETIC HEAD ASSEMBLY, AND MAGNETIC RECORDING AND REPRODUCING APPARATUS

BACKGROUND OF THE INVENTION

1. Field of the Invention

The present invention relates to a magnetic head, magnetic head assembly and magnetic recording and reproducing apparatus, and more particularly to a magnetic head, magnetic head assembly and magnetic recording and reproducing apparatus in a microwave assisted recording method.

2. Description of the Related Art

The demand placed on a hard disk unit, which is a magnetic recording and reproducing apparatus, is to improve performance of a magnetic recording medium and a magnetic head in order to increase a magnetic recording density. To increase the recording density of a magnetic recording medium, the size of each magnetic particle in a recording layer needs to be reduced to assure a signal-to-noise ratio (SNR) high enough for reproducing. If the size of the magnetic particle is reduced, however, the volume of the magnetic particle is reduced, causing magnetization to be likely to disappear due to heat fluctuation.

To prevent this and maintain a stable recording state, it is necessary to increase magnetic anisotropy energy (sometimes simply referred to below as Ku) of the magnetic particle in the recording layer. As for a magnetic particle having uniaxial magnetic anisotropy, a magnetic field having intensity necessary for magnetization reversal is referred to as a magnetic anisotropy field Hk, which is represented as the following equation: Hk=2 Ku/Ms, where Ms is saturation magnetization. If a material having large Ku, therefore, Hk becomes large, so a strong recording magnetic field is needed for recording on a magnetic recording medium.

To have a strong recording magnetic field, saturation magnetic flux density Bs of the main magnetic pole of a recording element needs to be increased. As indicated by a Slater-Pauling curve, however, the value of saturation magnetic flux density is peaked at about 2.4 T.

To overcome this situation, energy assisted recording is proposed in which auxiliary energy is given to a medium during recording to lower an effective recording magnetic field strength. A recording method in which a microwave magnetic field is used as an auxiliary energy source is referred to as microwave assisted magnetic recording (MAMR). MAMR is undergoing research and development toward its practical use.

In microwave assisted magnetic recording, when a microwave magnetic field is applied in a medium in-plane direction at the frequency according to an effective magnetic field (Heff) (obtained by adding the magnetic anisotropy field of the medium and a magnetic field generated from the main magnetic pole together) involved in magnetization in the recording layer, precession movement in magnetization in the recording layer is oscillated and the recording capability is assisted.

In an example of an MAMR method, a main magnetic pole forming a recording element of a magnetic head and a spin torque oscillator (STO) structured with multi-layer magnetic thin films in a magnetic gap in a trailing shield are formed, after which a microwave magnetic field is generated in an in-plane direction by self oscillation of the STO and the generated microwave magnetic field is applied to a magnetic recoding medium to induce precession movement in magnetization in the recording layer and assist magnetization reversal in a perpendicular direction (see Japanese Unexamined Patent Application Publication No. 2009-070541, for example).

However, the STO has serious technical problems such as: multi-layer magnetic thin films need to be laminated, making the process complex; to allow the STO to oscillate, a magnetic thin film having extremely high magnetic anisotropy is required; since the oscillation frequency rapidly changes due to a change in the strength of a magnetic field applied to the STO, it is difficult to control the oscillation frequency; and when the density of a current supplied into the STO is increased, the strength of the magnetic field is also increased, but the oscillation frequency is also changed, making it difficult to control these two parameters arbitrarily.

In contrast to a self-oscillating microwave assisted magnetic recording method, a head apparatus is proposed in which a current wire is provided in the vicinity of the main magnetic pole of a magnetic head so that a high-frequency in-plane magnetic field is generated in the vicinity of the main magnetic pole by externally passing a high-frequency current in a microwave band through the current wire, the generated magnetic field being superimposed on a perpendicular recording magnetic field generated from the main magnetic pole to assist magnetization reversal (see U.S. Patent Application Publication No. 2010/0309577A1, for example). This assisted method is referred to as the externally oscillated microwave assisted magnetic recording method.

With the externally oscillated microwave assisted magnetic recording method, it is possible to apply a high-frequency in-plane alternating magnetic field in a microwave band to a recording layer in a magnetic recording medium by superimposing the alternating magnetic field. Due to the resulting assist effect, a perpendicular recording magnetic field from the main magnetic pole can be greatly reduced, the perpendicular recording magnetic field being required for magnetization reversal in the recording layer. Even if the recording layer has a large coercive force Hc, it is also possible to record data in and delete it from the recording layer at high speed. In addition, the alternating magnetic field in the microwave band in the in-plane direction is generated by externally passing a high-frequency current through a current line provided in the vicinity of the main magnetic pole (externally oscillated microwave assisted magnetic recording), so features not found in self-oscillating microwave assisted magnetic recording by the STO are obtained. For example, these features are: the frequency of high-frequency current can be highly precisely controlled; a magnetic field generated in an plane can be easily controlled by controlling the amplitude of high-frequency current; due to these features, a frequency in a microwave band and the strength of a generated in-plane alternating magnetic field can be controlled independently, so it is possible to set a frequency adequate to the strong-magnetization resonant frequency of a magnetic particle in the recording layer and optimally design a magnetic head in consideration of optimum apportionment between the in-plane alternating magnetic field and the vertical recording magnetic field; and the structure of the magnetic head is simple, so its mass production is easy.

In U.S. Patent Application Publication No. 2010/0309577A1, a magnetic head is proposed that is structured so that a wire 111, which generates a microwave magnetic field, is embedded under the end surface of the pole tip 103 and the microwave magnetic field is superimposed on the data-encoded magnetic field 201 generated from the pole tip 103 (see FIGS. 1 to 3 in U.S. Patent Application Publication No. 2010/0309577A1). In this magnetic head, the data-encoded magnetic field 201 generated from the pole tip 103 and the microwave field 211 generated from the wire 111 are superimposed in the targeted bit area 220, enabling microwave assisted magnetic recording.

SUMMARY OF THE INVENTION

In the structure of the magnetic head described in U.S. Patent Application Publication No. 2010/0309577A1, a slit is formed in the end surface of the pole tip103 and the wire 111 is embedded in the slot. Since the wire 111 is embedded in the end surface of the pole tip103, the strength and distribution of the recording signal magnetic field generated from the end surface of the pole tip103 are deteriorated.

The present invention addresses the above problems with the object of providing a magnetic head with which microwave assisted magnetic recording is possible without deteriorating the recording signal magnetic field. Another object of the present invention is to provide a magnetic head assembly and a magnetic recording and reproducing apparatus that include the magnetic head.

To achieve the above objects, the magnetic head according to the present invention has a first feature that the magnetic head includes a main magnetic pole used to apply a recording signal magnetic field to a magnetic recording medium and also includes a microwave line through which a microwave alternating current is transferred; the microwave line is connected to the main magnetic pole; the entire end surface of the main magnetic pole is positioned closer to air bearing surface than a connection portion at which the microwave line and main magnetic pole are mutually connected.

According to the present invention having the above feature, the main magnetic pole can be used as the microwave magnetic field generating source and the recording signal magnetic field and microwave magnetic field can be efficiently superimposed at a recording position in a recording layer, the recording position being immediately below the main magnetic pole. Since the entire end surface of the main magnetic pole is positioned closer to the air bearing surface than the connection portion at which the microwave line and main magnetic pole are mutually connected, the microwave line does not affect the shape of the end surface of the main magnetic pole. Therefore, microwave assisted magnetic recording can be achieved without deteriorating the recording signal magnetic field.

Furthermore, the magnetic head according to the present invention has a second feature that the microwave line is connected to a side surface of the main magnetic pole.

According to the present invention having the above feature, since the microwave line can be connected to the main magnetic pole without affecting the shape of the main magnetic pole, the main magnetic pole can be used as the microwave magnetic field generating source without impairing a function of the main magnetic pole to generate a recording signal magnetic field.

Furthermore, the magnetic head according to the present invention has a third feature that the magnetic head includes a magnetic shield positioned closer to the air bearing surface than the microwave line, and the entire end surface of the main magnetic pole is exposed from the magnetic shield toward the air bearing surface.

According to the present invention having the above feature, since the magnetic shield is disposed between the microwave line and the magnetic recording medium, the strength of the microwave magnetic field generated from the microwave line can be attenuated due to an eddy current loss caused when the microwave magnetic field passes through the magnetic shield. Since the entire end surface of the main magnetic pole is exposed from the magnetic shield toward the air bearing surface, a microwave magnetic field with a large strength can be efficiently applied to the recording position.

Furthermore, the magnetic head according to the present invention has a fourth feature that the main magnetic pole has a narrow portion, the width of which is gradually reduced toward the air bearing surface, and the microwave line is connected to the narrow portion.

According to the present invention having the above feature, since the microwave line is connected to the narrow portion of the main magnetic pole, a current path that passes through the main magnetic pole is shortened. The main magnetic pole has a larger electric resistance than the microwave line, so it is possible to lower the entire electric resistance and reduce heat generation and power consumption to small values. Since the connection portion at which the microwave line and main magnetic pole are mutually connected comes close to the air bearing surface, the strength of the microwave magnetic field is increased at the recording position.

Furthermore, the magnetic head according to the present invention has a fifth feature that the width of the microwave line is equal to or greater than the width of the main magnetic pole in a down-track direction. The width of the microwave line is its length measured in a direction parallel to a direction perpendicular to the height direction in the connection plane of the microwave line and the main magnetic pole. The height direction is perpendicular to the air bearing surface.

According to the present invention having the above feature, since the width of the microwave line is equal to or greater than the width of the main magnetic pole in the down-track direction, even if the thickness of the microwave line is reduced in its height direction, it is possible to flow a large current through the microwave line.

Furthermore, the magnetic head according to the present invention has a sixth feature that the microwave line has an end line connected to the main magnetic pole and a wiring line through which the microwave alternating current is supplied to the end line, and the wiring line has a larger cross-sectional area than the end line. The cross-sectional area is measured perpendicularly to the path of the microwave alternating current.

According to the present invention having the above feature, since the wiring line has a larger cross-sectional area than the end line, the entire resistance of the microwave line can be reduced without lowering the efficiency of microwave magnetic field generation, so power consumption can be suppressed.

According to the present invention, a magnetic head assembly equipped with the magnetic head described above is provided. The magnetic head assembly is an assembly in which the magnetic head and a support mechanism that support the magnetic head are mechanically and electrically assembled together.

According to the present invention, a magnetic recording and reproducing apparatus equipped with a magnetic recoding medium and the magnetic head assembly described above is also provided.

According to the present invention, it is possible to provide a magnetic head, a magnetic head assembly, and a magnetic recording and reproducing apparatus that enable microwave assisted magnetic recording without deteriorating the recording signal magnetic field.

DESCRIPTION OF THE PREFERRED EMBODIMENTS

Preferred embodiments that practice the present invention will be described in detail with reference the drawings. However, the present invention is not restricted by the embodiments described below. Constituent elements described below include constituent elements that a person having ordinary skill in the art can easily assume, constituent elements that are essentially the same as constituent elements that a person having ordinary skill in the art can easily assume, and constituent elements in a range of equivalents to constituent elements that a person having ordinary skill in the art can easily assume. The constituent elements described below can be appropriately combined. The constituent elements can also be omitted, replaced, or changed without departing from the intended scope of the present invention.

Figure 1:
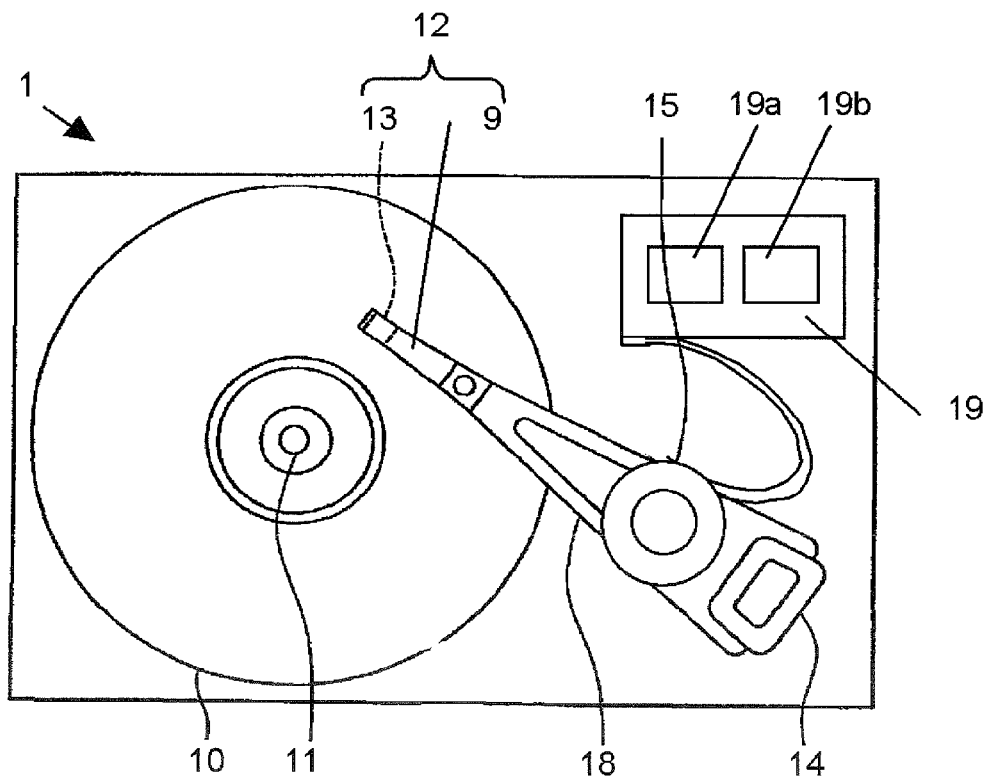
FIG. 1 schematically illustrates a magnetic recording and reproducing apparatus in a first embodiment.

FIG. 1 schematically illustrates a magnetic recording and reproducing apparatus in a first embodiment. The magnetic recording and reproducing apparatus 1 includes a magnetic recording medium (magnetic disk) 10 and a magnetic head assembly 12. There is no limitation to the number of magnetic recording media 10 and the number of magnetic head assemblies 12; a plurality of magnetic recording media 10 and a plurality of magnetic head assemblies 12 may be provided. The magnetic recording medium 10 includes a non-magnetic substrate 10d, on which a soft magnetic ground layer 10c, a recording layer 10b, and a protective layer 10a are laminated, as illustrated in FIGS. 4, 5, 10, and 13, which will be referenced later. The magnetic head assembly 12 is formed with a magnetic head slider 13 and a suspension 9 that supports the magnetic head slider 13. The magnetic recording medium 10 is rotated around its rotational axis by a spindle motor 11. The magnetic head slider 13 writes a data signal to and reads it from the magnetic recording medium 10. In the first embodiment, the magnetic head slider 13 suffices if it can write at least the data signal to the magnetic recording medium 10. The magnetic head assembly 12 is secured to an arm 18 that is rotatable around a pivot bearing axis 15. When the arm 18 and magnetic head assembly 12 are rotated by a voice coil motor (VCM) 14, the magnetic head slider 13 is positioned on the magnetic recording medium 10. A recording/reproducing/resonance control circuit 19 controls writing and reading operations of the magnetic head slider 13 and also controls a microwave alternating current used for strong magnetic resonance. Specifically, the recording/reproducing/resonance control circuit 19 includes a microwave generating circuit 19a and a control unit 19b.

The following description is based on the structure illustrated in FIG. 1.

Figure 2A:
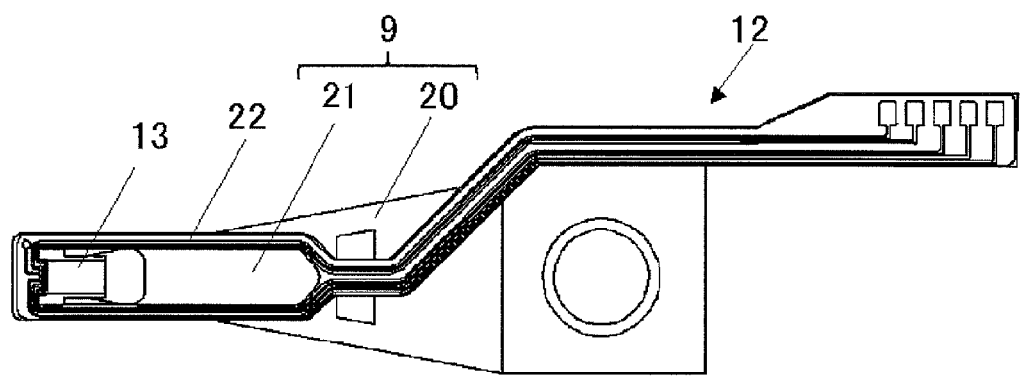
FIG. 2A is a plan view of a magnetic head assembly in the first embodiment.
Figure 2B:
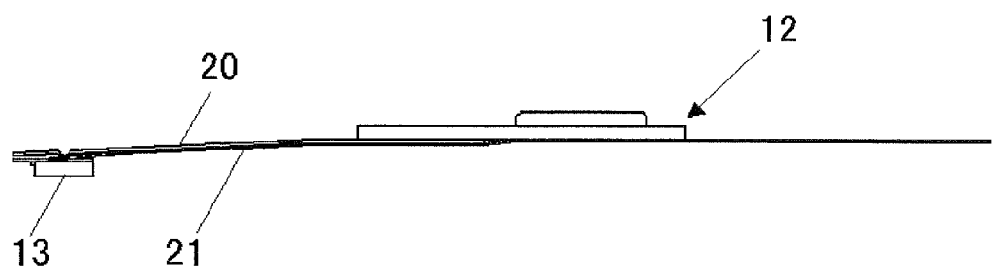
FIG. 2B is a side view of the magnetic head assembly in the first embodiment.

FIG. 2A is a plan view of the magnetic head assembly 12 (a bottom view as viewed from the same side as the magnetic recording medium 10), and FIG. 2B is its side view. The suspension 9 has a flexure 21, at one end of which the magnetic head slider 13 is attached, and a load beam 20 that presses the magnetic head slider 13 against the surface of the magnetic recording medium 10 with a prescribed pressure. The flexure 21, which is elastically deformable, has a gimbal function that causes the magnetic head slider 13 to follow changes on the surface of the magnetic recording medium 10. The flexure 21 is linked to the load beam 20. The load beam 20 is connected to the arm 18 that positions the magnetic head slider 13 on the magnetic recording medium 10. A transfer line 22 is formed on the surface of the suspension 9.

Figure 3:
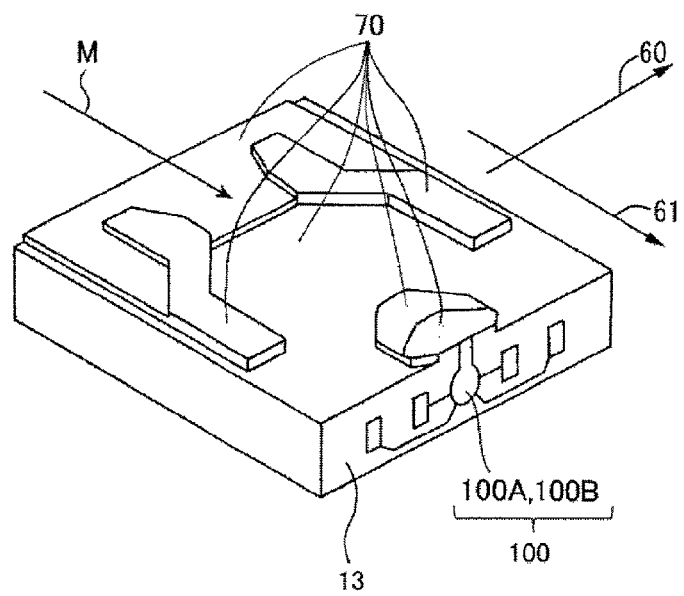
FIG. 3 is a perspective view of a magnetic head slider in the first embodiment.

FIG. 3 is a perspective view that schematically illustrates the magnetic head slider 13. The magnetic head slider 13 has air bearing surface 70 (surface facing the magnetic recording medium 10), which are directly involved in floating characteristics, and also has a magnetic head 100 on a side surface on the downstream side in a direction M in which the magnetic recording medium 10 moves (in the same direction as the direction of an air flow). The magnetic head 100 includes a recording head unit 100A and a reproducing head unit 100B. In the magnetic head slider 13, a direction that is orthogonal to the direction M and is parallel to the air bearing surface is referred to as the cross-track direction 60 and a direction that is the same as the direction M is referred to as the down-track direction 61.

The transfer line 22 in FIG. 2A includes a recording signal transfer line through which a recording signal is transferred to the recording head unit 100A illustrated in FIG. 3, a reproducing signal transfer line through which a reproduced output voltage is retrieved from the reproducing head unit 100B, and a microwave alternating current transfer line through which a microwave alternating current is supplied to a microwave line 32, which will be described later, in the recording head unit 100A.

The reproducing head unit 100B reproduces a recording signal recorded on the magnetic recording medium 10. From a structural viewpoint, the reproducing head unit 100B may be a reproducing head having a so-called giant magneto-resistive (GMR) effect or a reproducing head having a tunneling magneto-resistive (TMR) effect.

Figure 4:
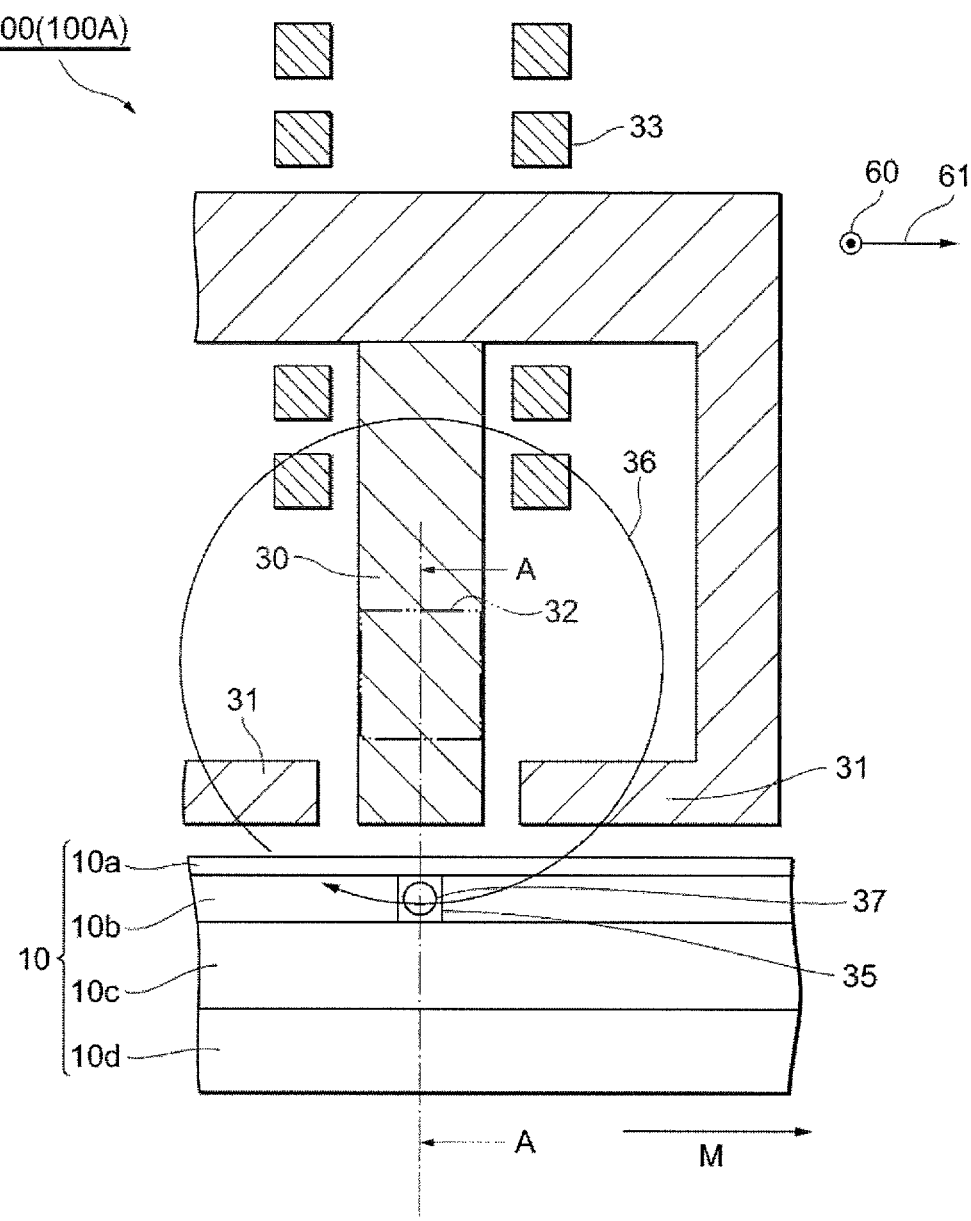
FIG. 4 is a schematic cross-sectional view of a recording head unit in the first embodiment as viewed from a cross-track direction.
Figure 5:
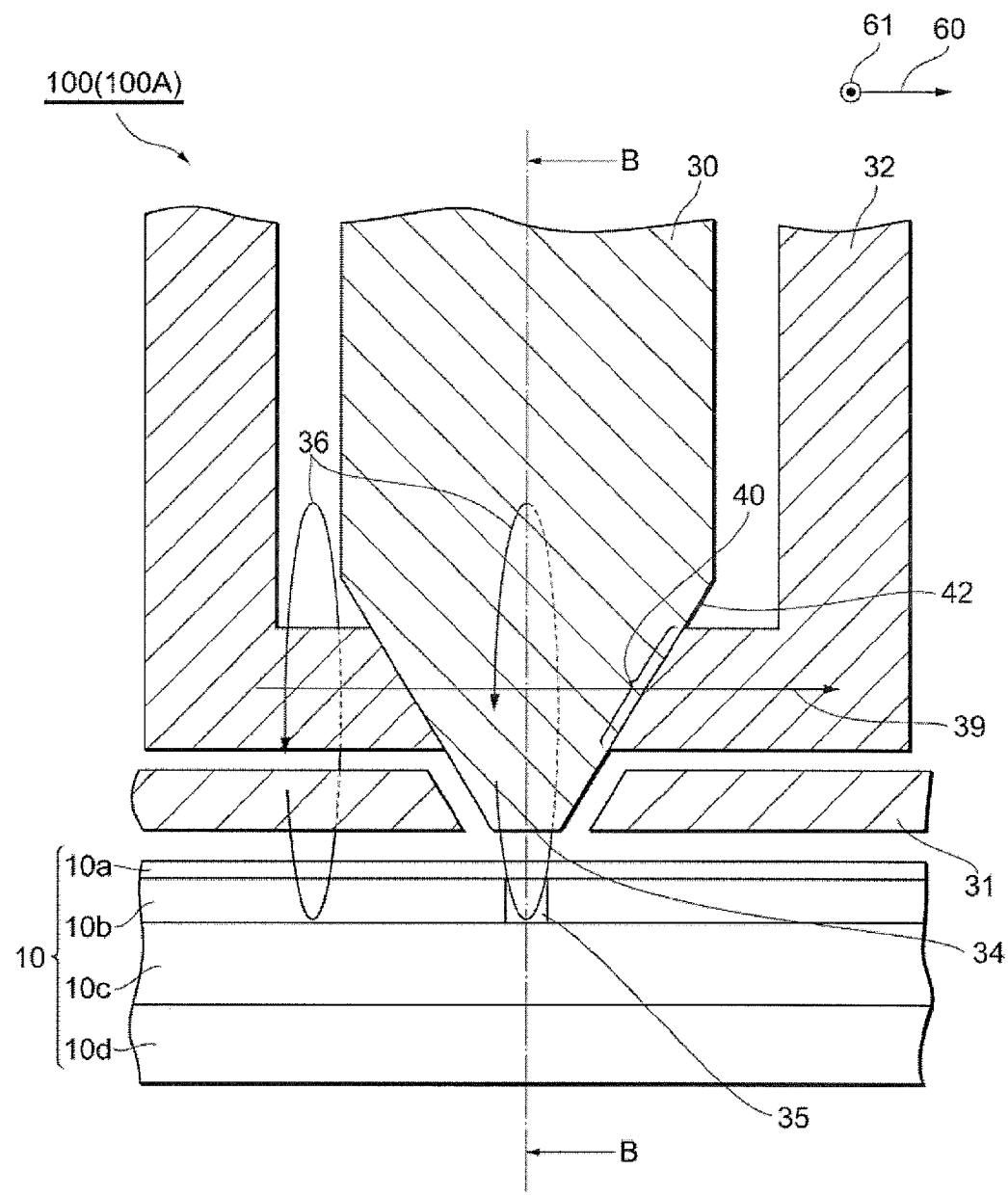
FIG. 5 is a schematic cross-sectional view illustrating a connection portion, in the recording head unit in the first embodiment, at which a main magnetic pole and a microwave wire are mutually connected.

FIG. 4 is a schematic cross-sectional view of the recording head unit 100A as viewed from the cross-track direction 60. In FIG. 4, the right and left direction is the down-track direction 61, and the direction perpendicular to the drawing sheet is the cross-track direction 60. FIG. 5 is a schematic cross-sectional view in the vicinity of the main magnetic pole end when the magnetic head 100 is viewed from the arrow A in FIG. 4. In FIG. 5, the direction perpendicular to the drawing sheet is the down-track direction 61, and the right and left direction is the cross-track direction 60. FIG. 4 is equivalent to a cross-sectional view as viewed from the arrow B in FIG. 5. In FIGS. 4 and 5 and FIGS. 6, 7, 10, and 13 to 17, which will be referenced later, the downside is the same side as the air bearing surface 70 (magnetic recording medium 10). The magnetic head 100 includes, in the recording head unit 100A, a main magnetic pole 30 used to apply a recording signal to the magnetic recording medium 10 and the microwave line 32 through which a microwave alternating current 39 is transferred. The microwave line 32 is connected to the main magnetic pole 30. The whole of the end surface 34 of the main magnetic pole 30 is positioned closer to the air bearing surface 70 than a connection portion 40 at which the microwave line 32 and main magnetic pole 30 are mutually connected. The whole of the end surface 34 of the main magnetic pole 30 is a flat surface. In FIG. 4, the microwave line 32, as viewed from the cross-track direction 60, at a position in the height direction of the connection portion 40 is represented as an area enclosed by the double-dot-dashed lines.

Figure 6:
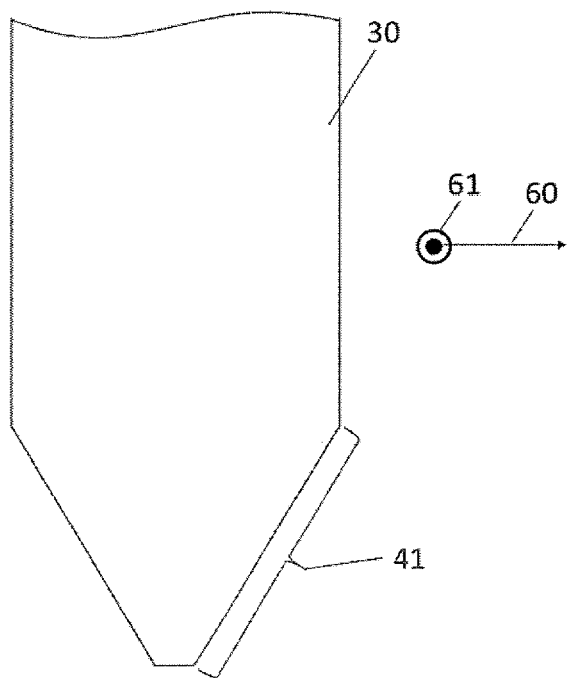
FIG. 6 schematically illustrates the main magnetic pole in the first embodiment as viewed from a down-track direction.
Figure 7:
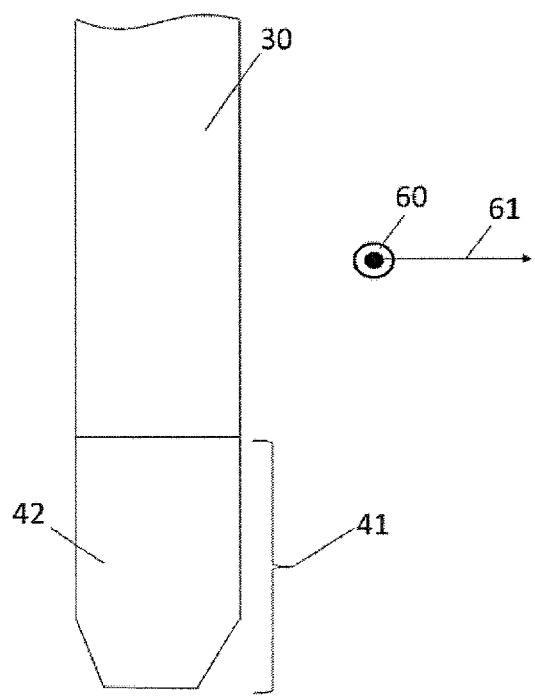
FIG. 7 schematically illustrates the main magnetic pole in a variation of the first embodiment as viewed from the cross-track direction.

The material of the main magnetic pole 30 is, for example, CoFe, CoFeNi, NiFe, or another material having high permeability. The main magnetic pole 30 generates a recoding signal magnetic field in a direction perpendicular to the magnetic recording medium 10. FIG. 6 schematically illustrates the main magnetic pole 30 as viewed from the down-track direction 61. As illustrated in FIG. 6, the main magnetic pole 30 is formed in a flat plate shape and has a narrow portion 41 in which its width in the cross-track direction 60 is gradually reduced toward the air bearing surface 70 so that a strong recording signal magnetic field can be applied to small areas on the magnetic recording medium 10. The microwave line 32 is connected to the narrow portion 41 on a side surface 42, facing in the cross-track direction 60, of the main magnetic pole 30. In the first embodiment, the width of the microwave line 32 is the same as the width of the main magnetic pole 30 in the down-track direction 61. The width of the microwave line 32 is its length measured in a direction parallel to a direction perpendicular to the height direction in the connection plane of the microwave line 32 and main magnetic pole 30. In the examples in FIGS. 4 and 5, the width of the microwave line 32 is its length measured in the down-track direction 61. The height direction is perpendicular to the air bearing surface 70. In FIGS. 4 to 6 and FIGS. 7, 10, and 13 to 17, which will be referenced later, the height direction is the vertical direction. As in the schematic drawing in FIG. 7, in which the main magnetic pole 30 is viewed from the cross-track direction 60, the narrow portion 41 of the main magnetic pole 30 may be tapered on the same side as the air bearing surface 70 in the down-track direction 61.

The material of the microwave line 32 is, for example, Cu, Au, Al, or another non-magnetic metal. Since the microwave line 32 is connected to the main magnetic pole 30, the microwave alternating current 39 is supplied to the main magnetic pole 30 and a microwave magnetic field 36 is generated from the main magnetic pole 30. When the microwave magnetic field 36 is generated from the main magnetic pole 30, a peak strength position 37 of a recording medium in-plane directional component of the generated microwave magnetic field 36 can be made to match a recording position 35.

Figure 8:
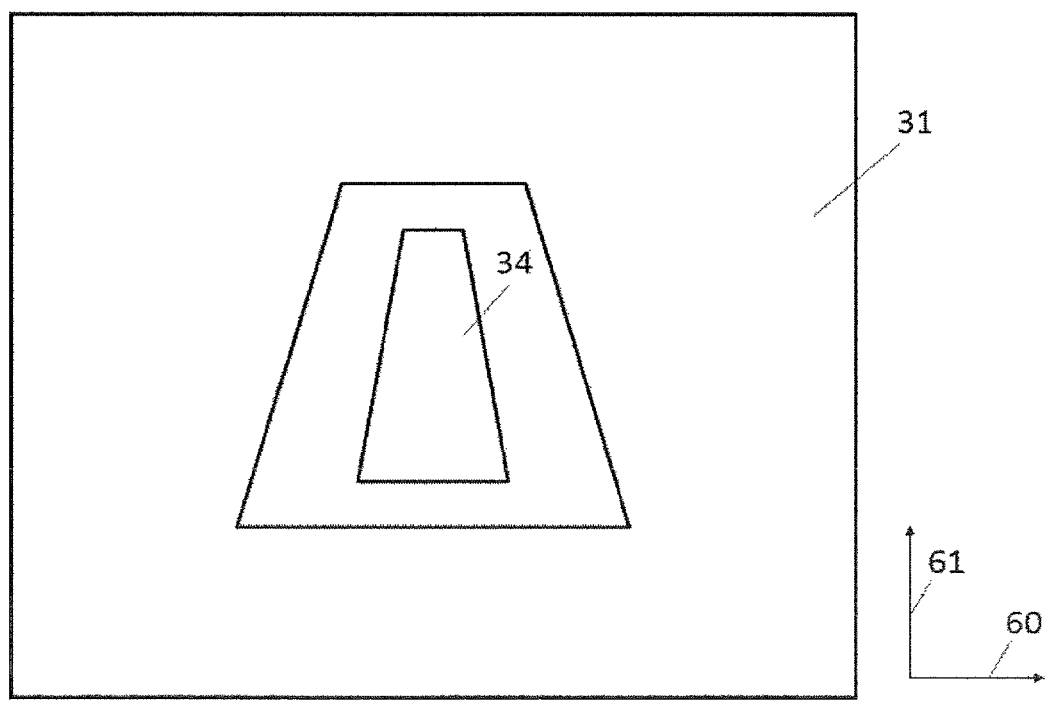
FIG. 8 schematically illustrates the recording head unit in the first embodiment as viewed from air bearing surface.

The recording head unit 100A is structured as a single-pole magnetic head that has a return magnetic pole at the trailing end. As illustrated in FIGS. 4 and 5, the recording head unit 100A further has a magnetic shield 31 positioned closer to the air bearing surface 70 than the microwave line 32, and the whole of the end surface 34 of the main magnetic pole 30 is exposed from the magnetic shield 31 toward the air bearing surface 70. FIG. 8 schematically illustrates the recording head unit 100A as viewed from the air bearing surface 70. The magnetic shield 31 encloses the end of the main magnetic pole 30 in the four ways. The whole of the end surface 34 of the main magnetic pole 30 is exposed from the magnetic shield 31 toward the air bearing surface 70. The material of the magnetic shield 31 is, for example, CoFe, CoFeNi, NiFe, or another material having high permeability. The magnetic shield 31 has the role of locally applying the recording signal magnetic field generated from the main magnetic pole 30 to the magnetic recording medium 10. The magnetic shield 31 also doubles as a return magnetic pole used to form a magnetic path to the main magnetic pole 30. To allow a magnetic flux to flow into the main magnetic pole 30 when a recording signal is written to the magnetic recording medium 10, the recording head unit 100A further includes a write coil 33 disposed so as to wind the magnetic path including the main magnetic pole 30 and magnetic shield 31, as illustrated in FIG. 4. Although not illustrated, the end surface 34 of the main magnetic pole 30 and the surface of the magnetic shield 31 on the same side as the air bearing surface 70 are covered with a diamond like carbon (DLC) film or another protective film.

Next, the effect of the magnetic head 100 (recording head unit 100A) will be described.

Since the magnetic head 100 includes the main magnetic pole 30 used to apply a recording signal magnetic field to the magnetic recording medium 10 and also includes the microwave line 32 through which a microwave alternating current 39 is transferred and the microwave line 32 is connected to the main magnetic pole 30, the main magnetic pole 30 can be used as the microwave magnetic field generating source and the recording signal magnetic field and microwave magnetic field can be efficiently superimposed at the recording position 35, which is immediately below the main magnetic pole 30, in the recording layer. Since the whole of the end surface 34 of the main magnetic pole 30 is positioned closer to the air bearing surface 70 than the connection portion 40 at which the microwave line 32 and main magnetic pole 30 are mutually connected, the microwave line 32 does not affect the shape of the end surface 34 of the main magnetic pole 30. Therefore, microwave assisted magnetic recording can be achieved without deteriorating the recording signal magnetic field.

Furthermore, since, in the magnetic head 100, the microwave line 32 is connected to the main magnetic pole 30 on the side surface 42, the microwave line 32 can be connected to the main magnetic pole 30 without affecting the shape of the main magnetic pole 30. Therefore, the main magnetic pole 30 can be used as the microwave magnetic field generating source without impairing a function of the main magnetic pole 30 to generate a recording signal magnetic field.

Furthermore, the magnetic head 100 includes the magnetic shield 31 positioned closer to the air bearing surface 70 than the microwave line 32. Therefore, since the magnetic shield 31 is disposed between the microwave line 32 and the magnetic recording medium 10, the strength of the microwave magnetic field generated from the microwave line 32 can be attenuated due to an eddy current loss caused when the microwave magnetic field passes through the magnetic shield 31. Since the whole of the end surface 34 of the main magnetic pole 30 is exposed from the magnetic shield 31 toward the air bearing surface 70, a microwave magnetic field with a large strength can be efficiently applied to the recording position 35.

Since the microwave magnetic field generated from the main magnetic pole 30 and applied to the recording position 35 reaches the recording position 35 without passing through the magnetic shield 31, the strength of the microwave magnetic field is not attenuated by the eddy current. However, the strength of the microwave magnetic field applied to the recording layer 10b except the recording position 35 is attenuated by the eddy current because the microwave magnetic field passes through the magnetic shield 31. Therefore, the microwave magnetic field can be efficiently applied to the recording position 35. If a strong microwave magnetic field is applied to other than the recording position 35, a signal that has been recorded may be deleted. Therefore, it is desirable to attenuate the strength of the microwave magnetic field applied to other than the recording position 35.

Figure 9:
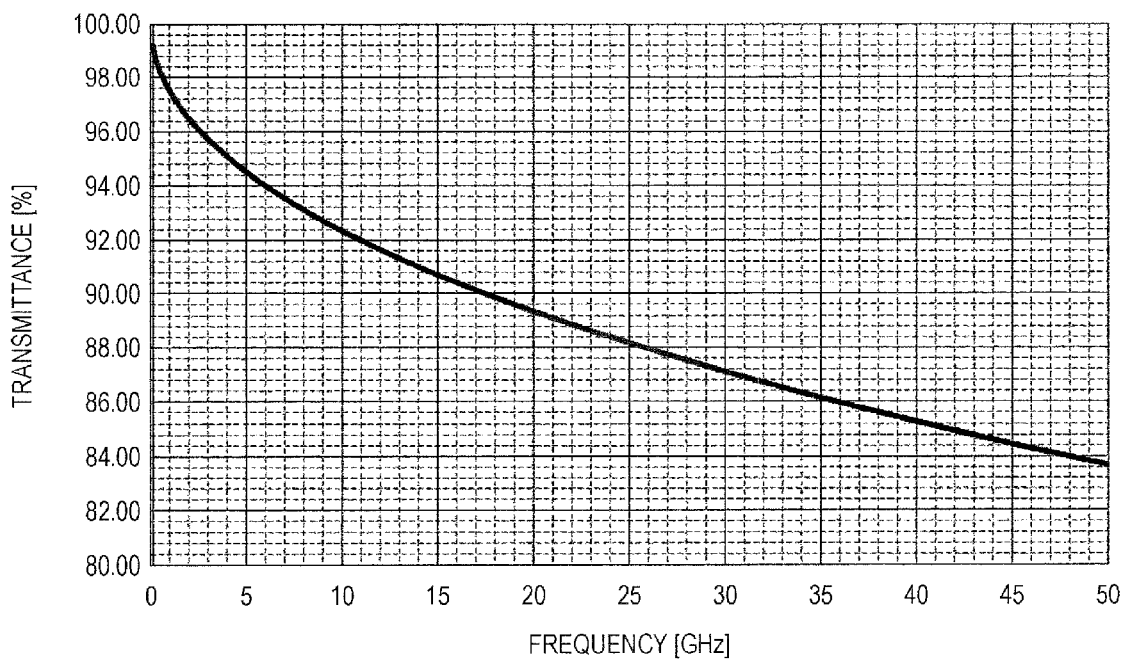
FIG. 9 is a graph indicating frequency dependence of magnetic field transmittance when a microwave magnetic field passes through a magnetic shield.

FIG. 9 is a graph representing a simulation result of transmittance of the microwave magnetic field when it passes through the magnetic shield 31. Assuming that the material of the magnetic shield 31 is permalloy, conductivity was set to $1.79 \times 10^6$ S/m. Relative permeability $\mu$ was set to 1 because magnetization cannot follow for a microwave in a several gigahertz band. The thickness of the magnetic shield 31 in its height direction was set to 0.3 μm. It is found that, in an area, in a microwave magnetic field assumed to be used in microwave assisted magnetic recording, in which the frequency band of the microwave is 10 to 50 GHz, the microwave magnetic field is attenuated by at least about 10% due to an eddy current caused when the microwave magnetic field passes through the magnetic shield 31. In the magnetic head 100, the whole of the end surface 34 of the main magnetic pole 30, which is a microwave generating source, is exposed from the magnetic shield 31 toward the air bearing surface 70, so it is possible to apply the microwave magnetic field to the recording position 35 without the microwave magnetic field being attenuated by the magnetic shield 31. However, the microwave magnetic field applied to the recording layer 10b except the recording position 35 is attenuated by the magnetic shield 31, so the microwave magnetic field can be efficiently applied to the recording position 35.

Furthermore, in the magnetic head 100, the main magnetic pole 30 has the narrow portion 41, the width of which is gradually reduced toward the air bearing surface 70, and the microwave line 32 is connected to the narrow portion 41. Therefore, the current path passing through the main magnetic pole 30 is shortened. Thus, since the main magnetic pole 30 has a larger electric resistance than the microwave line 32, the entire electric resistance can be lowered and heat generation and power consumption can be reduced to small values. Since the connection portion 40 at which the microwave line 32 and main magnetic pole 30 are mutually connected comes close to the air bearing surface 70, the strength of the microwave magnetic field is increased at the recording position 35.

Figure 10:
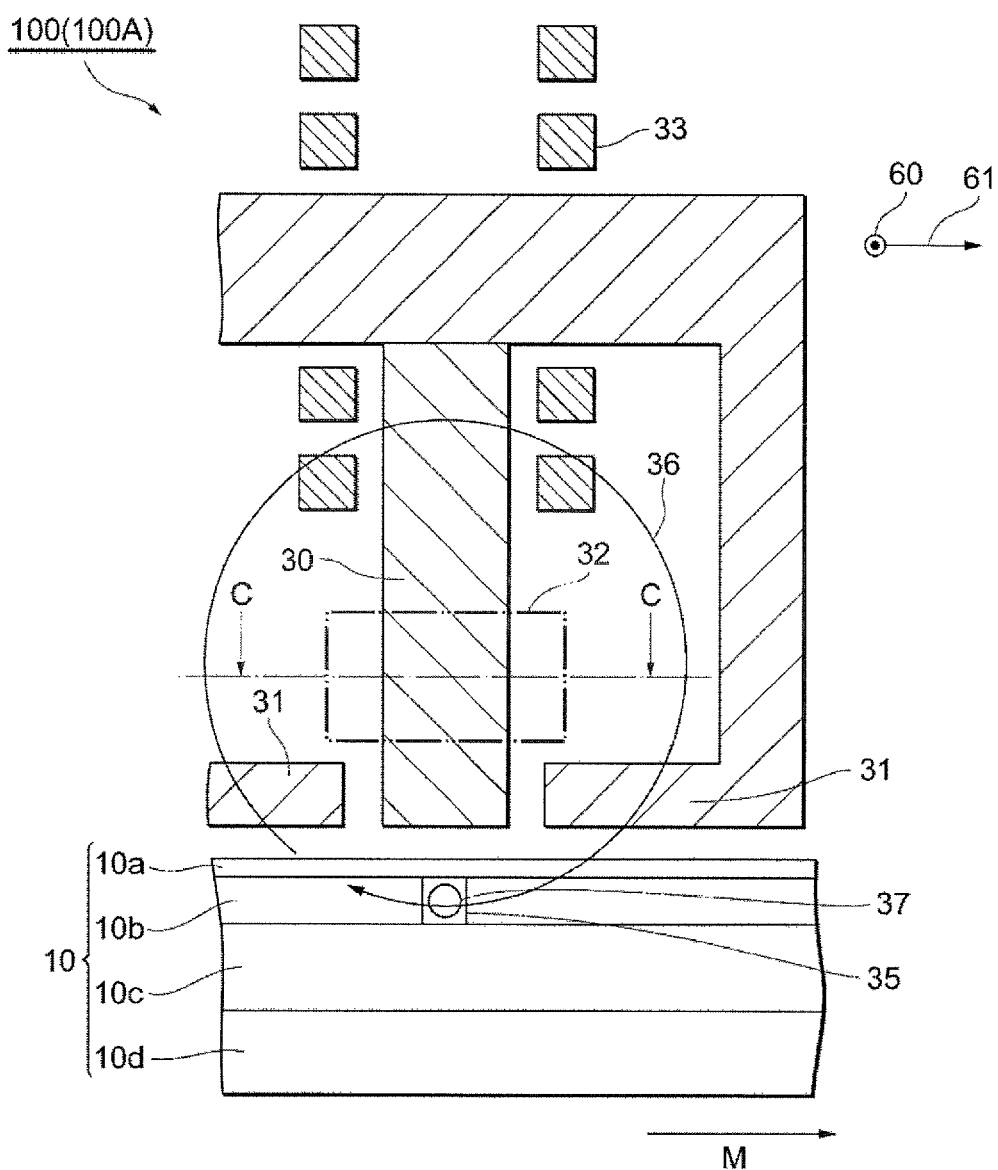
FIG. 10 is a schematic cross-sectional view in which the widths of the microwave line and main magnetic pole in another variation of the first embodiment are compared.
Figure 11:
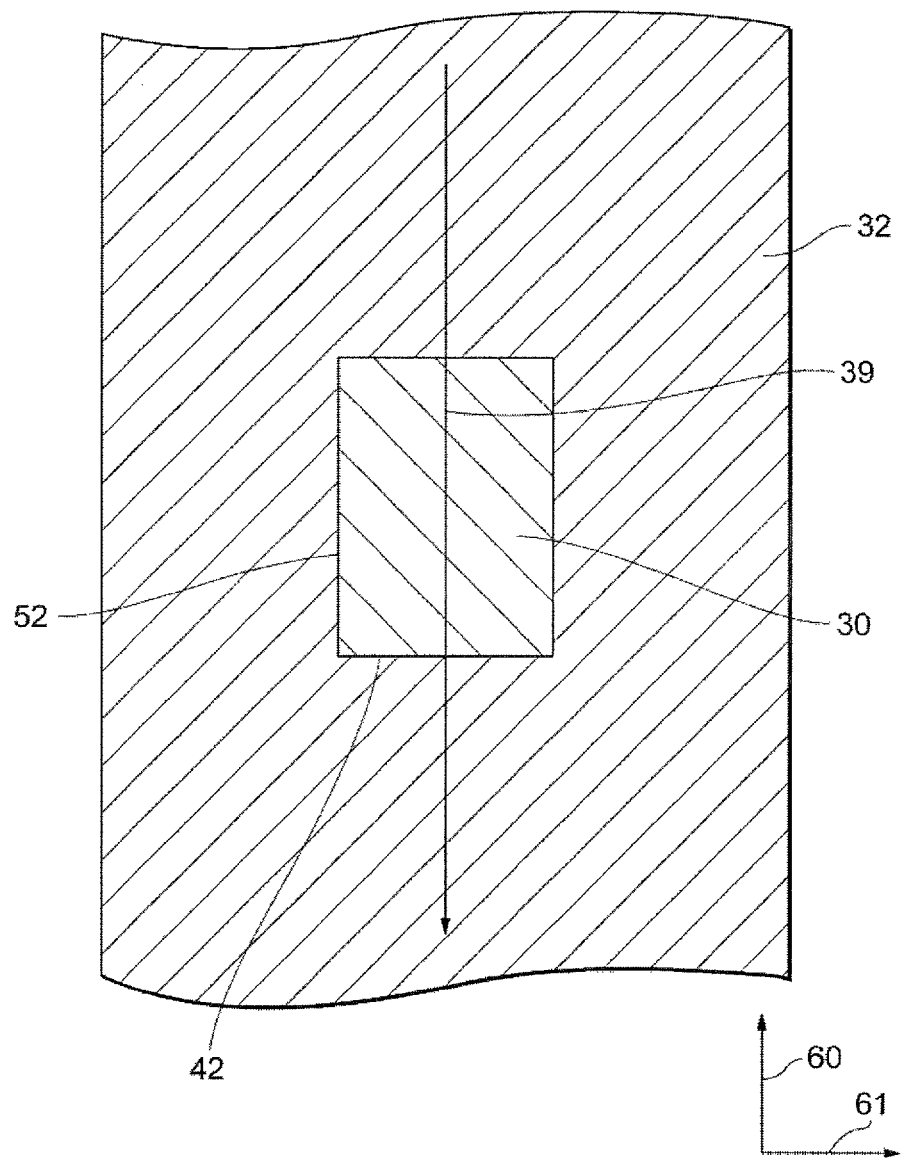
FIG. 11 is a schematic cross-sectional view illustrating the connection portion at which the main magnetic pole and microwave wire in the other variation of the first embodiment are mutually connected.
Figure 12:
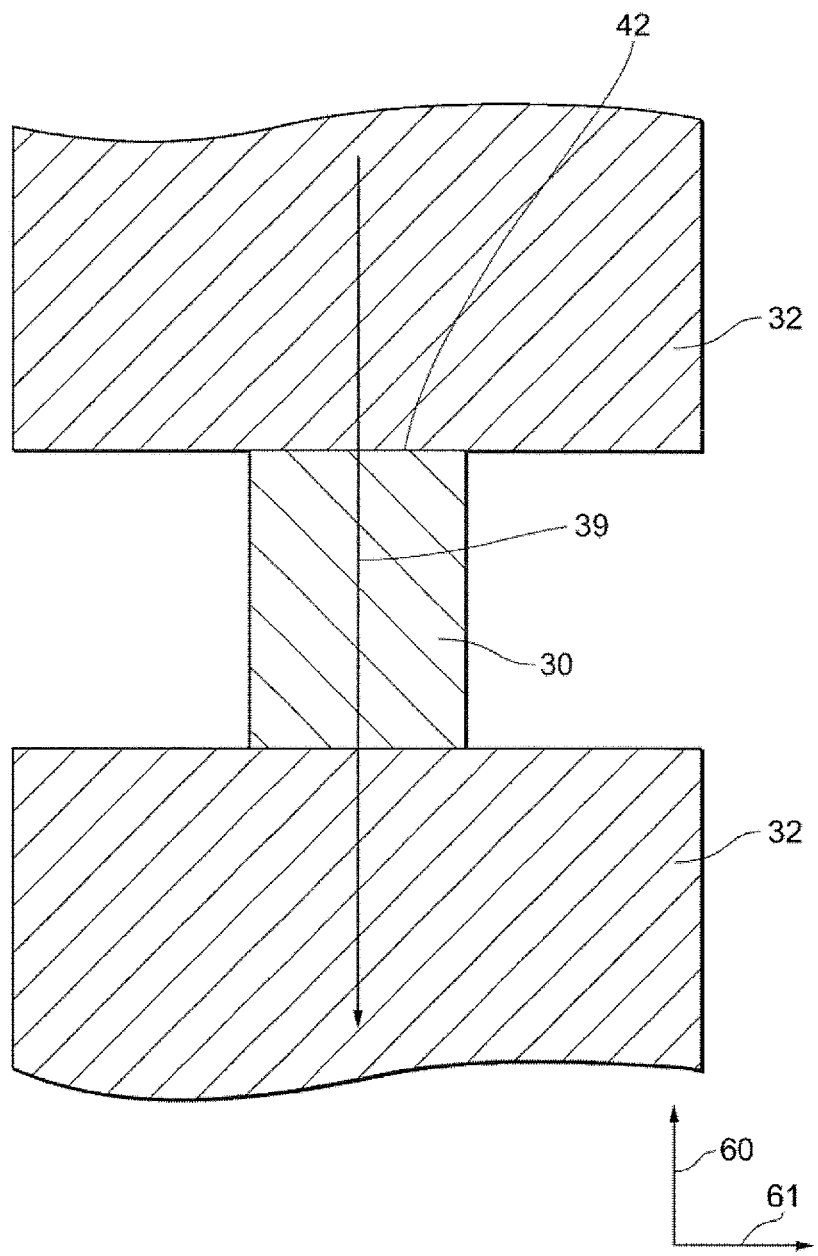
FIG. 12 is a schematic cross-sectional view illustrating another shape of the connection portion at which the main magnetic pole and microwave wire in the other variation of the first embodiment are mutually connected.

In the magnetic head 100, since the microwave line 32 is connected to the side surface 42 of the main magnetic pole 30, the microwave line 32 can be freely shaped. For example, the microwave line 32 can have a large width, so the microwave alternating current 39 flowing through the microwave line 32 can be made large and a microwave magnetic field strength necessary for microwave assisted recording can thereby be obtained. The microwave alternating current 39 flowing through the microwave line 32 can also be made large by increasing the thickness of the microwave line 32 in its height direction. In this case, however, the effective position at which the microwave magnetic field is generated is displaced away from the air bearing surface 70, reducing the strength of the microwave magnetic field applied to the magnetic recording medium 10. The width of the microwave line 32 is preferably equal to or greater than the width of the main magnetic pole 30 in the down-track direction 61. Although, in the first embodiment illustrated in FIG. 4, the width of the microwave line 32 (in the drawing, width in the down-track direction 61) is equal to the width of the main magnetic pole 30 in the down-track direction 61, the width of the microwave line 32 may be larger than the width of the main magnetic pole 30 in the down-track direction 61, as illustrated in FIG. 10. FIG. 10 is a cross-sectional view of the recording head unit 100A in a variation of the first embodiment, as viewed from the cross-track direction 60. In FIG. 10, the microwave line 32, as viewed from the cross-track direction 60, at a position in the height direction of the connection portion 40 is represented as an area enclosed by the double-dot-dashed lines. Since the width of the microwave line 32 is equal to or greater than the width of the main magnetic pole 30 in the down-track direction 61, even if the thickness of the microwave line 32 in its height direction is reduced, the microwave alternating current 39 flowing through the microwave line 32 can be made large. FIGS. 11 and 12 are a cross-sectional view illustrating the vicinity of a portion, as viewed from the arrow C in FIG. 10, at which the main magnetic pole 30 and microwave line 32 are mutually connected. For example, the microwave line 32 can be connected to the main magnetic pole 30 so that the microwave line 32 encloses the side surfaces 42 and 52 of the main magnetic pole 30, as illustrated in FIG. 11. The side surface 52 is a side surface, facing in the down-track direction 61, of the main magnetic pole 30. Alternatively, the microwave line 32 may be connected to only to the side surface 42 of the main magnetic pole 30, as illustrated in FIG. 12. In this case as well, the entire resistance of the microwave line 32 can be lowered and power consumption can be reduced.

Figure 13:
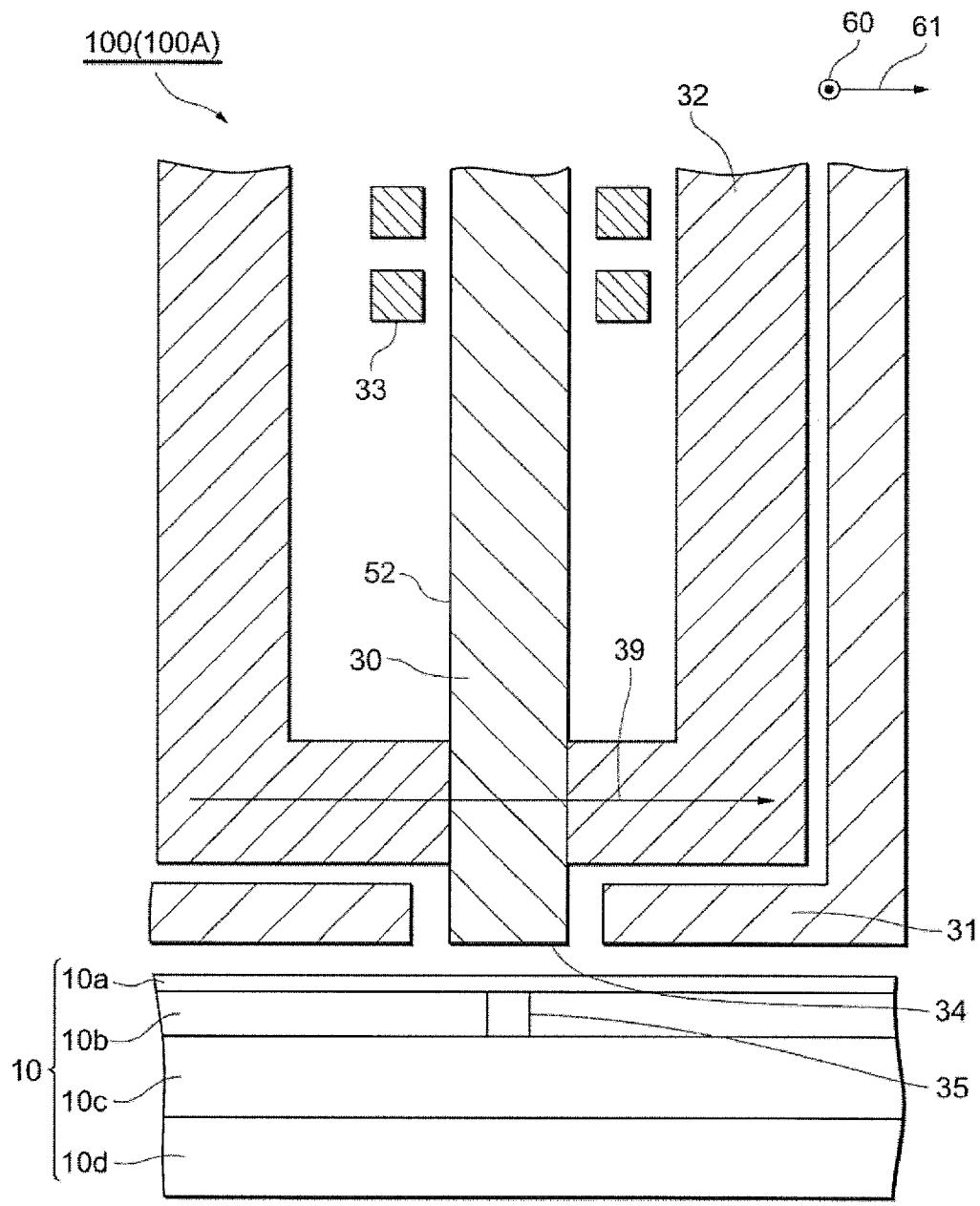
FIG. 13 is a schematic cross-sectional view illustrating the connection portion, in the recording head unit in yet another variation of the first embodiment, at which the main magnetic pole and microwave wire are mutually connected.

Although, in the first embodiment, the microwave line 32 is connected to the side surface 42, facing in the cross-track direction 60, of the main magnetic pole 30, the microwave line 32 may be connected to the side surface 52, facing in the down-track direction 61, of the main magnetic pole 30, as illustrated in FIG. 13. FIG. 13 is a schematic cross-sectional view of the recording head unit 100A in a variation of the first embodiment, as viewed from the cross-track direction 60. There is no particular limitation to the direction of the side surface, of the main magnetic pole 30, to which the microwave line 32 is connected. Since the microwave line 32 is connected to a side surface, facing in an arbitrary direction, of the main magnetic pole 30, the microwave line 32 can be connected to the main magnetic pole 30 without affecting the shape of the main magnetic pole 30. Therefore, the main magnetic pole 30 can be used as the microwave magnetic field generating source without impairing a function of the main magnetic pole 30 to generate a recording signal magnetic field.

Figure 14:
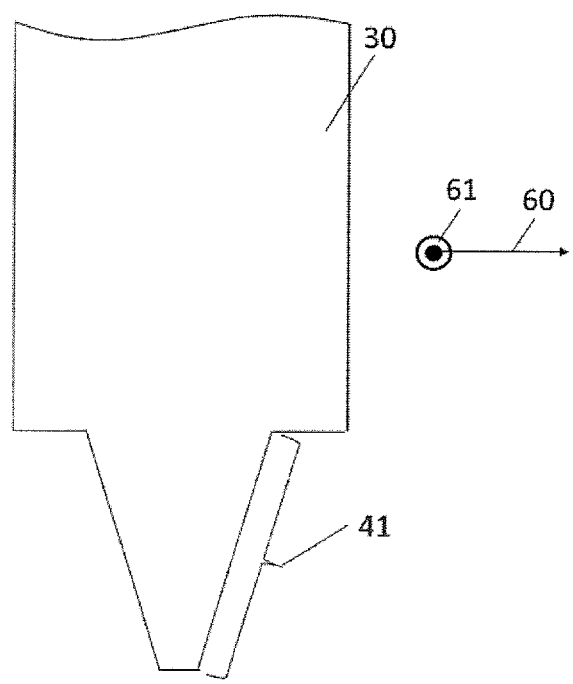
FIG. 14 schematically illustrates another shape of the narrow portion of the main magnetic pole.
Figure 15:
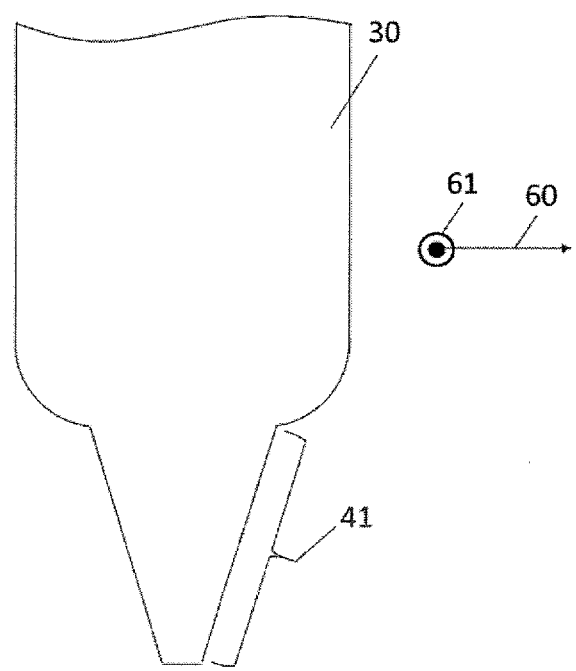
FIG. 15 schematically illustrates yet another shape of the narrow portion of the main magnetic pole.

Besides the shape illustrated in FIG. 5, the narrow portion 41 may have shapes as illustrated in FIGS. 14 and 15. FIGS. 14 and 15 schematically illustrate a shape of the narrow portion 41 of the main magnetic pole 30, as viewed from the down-track direction 61.

Figure 16:
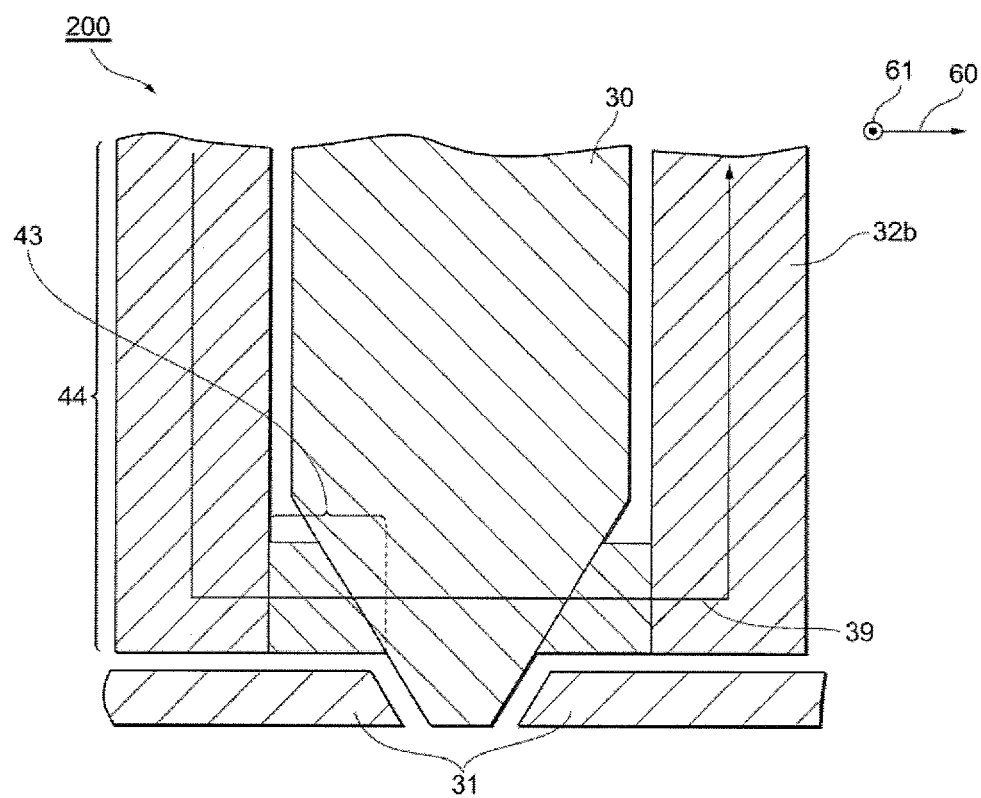
FIG. 16 is a schematic cross-sectional view illustrating the connection portion, in the recording head unit in a second embodiment, at which the main magnetic pole and microwave wire are mutually connected.

FIG. 16 is a cross-sectional view of a magnetic head 200 in a second embodiment, as viewed from the cross-track direction 60. In the magnetic head 200, a microwave line 32b includes an end line 43 connected to the main magnetic pole 30 and a wiring line 44 through which the microwave alternating current 39 is supplied to the end line 43, and the wiring line 44 has a larger cross-sectional area than the end line 43. The other structures are the same as in the first embodiment. The cross-sectional area is measured perpendicularly to the direction in which the microwave alternating current 39 flows. When the wiring line 44 has a larger cross-sectional area than the end line 43, the entire resistance of the microwave line 32b can be reduced without lowering the efficiency of microwave magnetic field generation, so power consumption can be suppressed.

Figure 17:
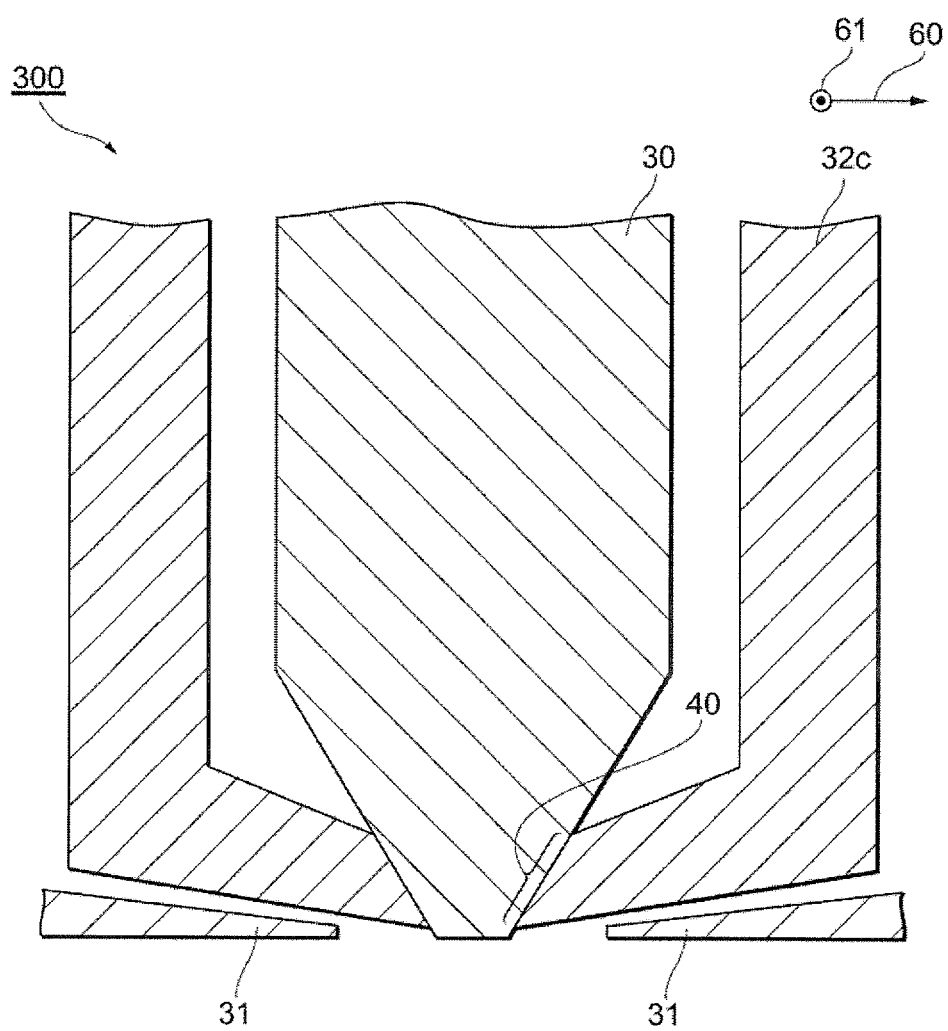
FIG. 17 is a schematic cross-sectional view illustrating the connection portion, in the recording head unit in the third embodiment, at which the main magnetic pole and microwave wire are mutually connected.

FIG. 17 is a cross-sectional view of a magnetic head 300 in a third embodiment, as viewed from the cross-track direction 60. As in the magnetic head 300, the thickness of the magnetic shield 31 in its height direction, the magnetic shield 31 being adjacent to the main magnetic pole 30 in the cross-track direction 60, may be reduced toward the main magnetic pole 30, and a microwave line 32c may be disposed so as to come close to the air bearing surface 70 toward the main magnetic pole 30 and may be connected to the main magnetic pole 30. It is only necessary to insulate the microwave line 32c and magnetic shield 31 from each other. In this arrangement, the connection portion 40 at which the microwave line 32c and main magnetic pole 30 are mutually connected can be brought close to the air bearing surface 70, so the strength of the microwave magnetic field can be increased at the recording position 35.

What is claimed is:

1. A magnetic head comprising:
   a main magnetic pole configured to apply a recording signal magnetic field to a magnetic recording medium; and
   first microwave line and second microwave line, through which a microwave alternating current is transferred, the first microwave line and the second microwave line being made of non-magnetic metal; wherein
   the first microwave line is directly connected to the main magnetic pole at a first connection position, the second microwave line is directly connected to the main magnetic pole at a second connection position, and
   an entire end surface of the main magnetic pole is positioned closer to an air bearing surface than the first connection position and the second connection position.

2. The magnetic head according to claim 1, wherein the first and second microwave lines are directly connected to a respective side surface of the main magnetic pole.

3. The magnetic head according to claim 1, wherein:
   the magnetic head includes a magnetic shield positioned closer to the air bearing surface than the first and second microwave lines; and
   the entire end surface of the main magnetic pole is exposed from the magnetic shield toward the air bearing surface.

4. The magnetic head according to claim 1, wherein:
   the main magnetic pole has a narrow portion, a width of which is gradually reduced toward the air bearing surface; and
   the first and second microwave lines are directly connected to the narrow portion.

5. The magnetic head according to claim 1, wherein a width of the first and second microwave lines is equal to or greater than a width of the main magnetic pole in a down-track direction.

6. The magnetic head according to claim 1, wherein each of the first and second microwave lines has an end line directly connected to the main magnetic pole and a wiring line through which the microwave alternating current is supplied to the end line, the wiring line having a larger cross-sectional area than the end line.

7. A magnetic head assembly that includes the magnetic head according to claim 1.

8. A magnetic recording and reproducing apparatus that includes a magnetic recording medium and the magnetic head assembly according to claim 7.

* * * * *